(12) United States Patent
AbuSamra et al.

(10) Patent No.: US 7,000,751 B2
(45) Date of Patent: Feb. 21, 2006

(54) NORMALLY OPEN CLUTCH ASSEMBLY DEVICE

(75) Inventors: Muneer AbuSamra, Southern Pines, NC (US); Ludger Ronge, Eriskirch (DE); Charles E. Allen, Jr., Rochester Hills, MI (US); Winfried Sturmer, Euerbach (DE); Karl-Fritz Heinzelmann, Meckenbeuren (DE); Loren Christopher Dreier, Vass, NC (US); Robert Anthony Sayman, Laurinburg, NC (US); James Henry DeVore, Laurinburg, NC (US); Ronald Peter Muetzel, Friedrichshafen (DE)

(73) Assignee: ZF Meritor, LLC, Maxton, NC (US)

( * ) Notice: Subject to any disclaimer, the term of this patent is extended or adjusted under 35 U.S.C. 154(b) by 55 days.

(21) Appl. No.: 10/744,475

(22) Filed: Dec. 23, 2003

(65) Prior Publication Data

US 2005/0133337 A1 Jun. 23, 2005

(51) Int. Cl.
*F16D 43/08* (2006.01)
(52) U.S. Cl. ............................ 192/105 CP; 192/70.22; 192/103 A; 192/114 R

(58) Field of Classification Search ............ 192/105 C, 192/105 CP, 105 CS, 103 A, 109 R, 114 R; 464/33
See application file for complete search history.

(56) References Cited

U.S. PATENT DOCUMENTS

| | | | | |
|---|---|---|---|---|
| 1,689,913 A | * | 10/1928 | Carrey | 192/105 BA |
| 2,107,075 A | * | 2/1938 | Lyman | 192/105 CP |
| 4,819,779 A | * | 4/1989 | Nickel et al. | 192/105 BA |
| 5,807,179 A | * | 9/1998 | Hansen et al. | 464/33 |
| 6,808,055 B1 | * | 10/2004 | Kummer et al. | 192/105 C |
| 2003/0042108 A1 | | 3/2003 | Gochenour et al. | |

* cited by examiner

*Primary Examiner*—Richard M. Lorence
(74) *Attorney, Agent, or Firm*—Carlson, Gaskey & Olds

(57) ABSTRACT

A normally open clutch assembly includes a device holding a centrifugal weight in a position causing axial movement of pressure plates and thereby a clamping force between pressure plates and the friction disks. The clamping force holds the friction disks in a desired aligned position during assembly.

19 Claims, 5 Drawing Sheets

NORMALLY OPEN CLUTCH ASSEMBLY DEVICE

BACKGROUND OF THE INVENTION

This invention relates to a normally open clutch assembly, and specifically to a device for maintaining alignment of a normally open clutch during assembly.

Typically, a normally open clutch assembly includes a rotating input member such as a flywheel, that engages one or more friction disks. The frictions disks are forced against the flywheel by one or more pressure plates. An output shaft is driven by rotation of the friction disks. A plurality of centrifugal weights are pivotally mounted to rotate radially outward in response to rotation of the clutch assembly. As the rotational speed of the clutch assembly increases rollers on the centrifugal weights are forced up a ramped surface to force engagement of the pressure plates with the friction disks and transmit rotational movement to the output shaft.

Assembly of a clutch assembly requires proper alignment between the friction disks and the flywheel. Normally closed clutch assemblies use the biasing force normally clamping the pressure plates against the friction disks to maintain proper alignment during assembly. Disadvantageously, a normally open clutch assembly does not clamp the friction disks unless the centrifugal weights are driven outward by rotation of the clutch assembly. Therefore the friction disks are not held in a desired aligned position during assembly.

Alignment devices for normally open clutch assemblies include cammed sleeves inserted within the clutch assembly to hold the centrifugal weights in a position where the pressure plates hold the friction plates in proper alignment with the flywheel. Such cammed sleeves are costly and time consuming to install and produce.

Accordingly, it is desirable to develop a simple and cost effective device for maintaining alignment of friction disks of a normally open clutch assembly during assembly.

SUMMARY OF THE INVENTION

The present invention is a device for holding centrifugal weights of a normally open clutch in a position causing application of clamping forces to maintain friction disk alignment.

The clutch assembly of this invention includes a plurality of holding members holding a corresponding plurality of centrifugal weights in a position causing engagement between pressure plates and the friction disks. Each of the holding members holds a corresponding centrifugal weight in a position causing application of a clamping force on the friction disks. The clamping force holds the friction disks in the desired aligned position during assembly.

Another device according to this invention includes a sleeve movable between an engaged position with at least some of the centrifugal weights, and a released position. The engaged position holds the centrifugal weights in a position causing the application of clamping forces on the friction disks. The clamping force maintains the desired alignment of the friction disks relative to the clutch cover and flywheel during assembly. After assembly, the sleeve is movable to selectively engage the clutch assembly during circumstances where full clutch clamping force is desired, although sufficient centrifugal force is not available.

Accordingly, the devices of this invention provide simple and cost effective alignment of friction disks within a normally open clutch during assembly.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
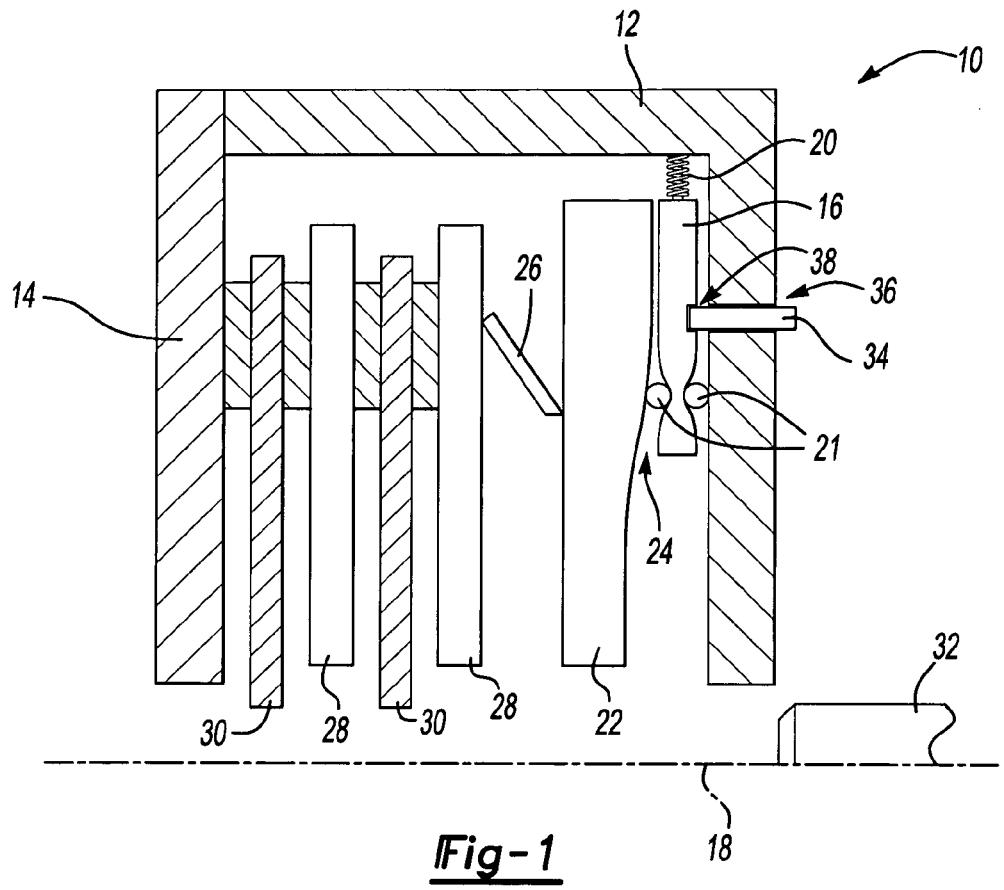
FIG. 1 is a cross-sectional view of a clutch assembly including a positioning pin according to this invention.

Referring to FIG. 1, a clutch assembly 10 includes a clutch cover 12 attached to a flywheel 14. A plurality of centrifugal weights 16 are pivotally mounted within the clutch cover 12 and rotate radially outward in response to rotation of the clutch cover 12. Each centrifugal weight 16 is biased toward a central axis 18 by a biasing spring 20. Rollers 21 are mounted to each centrifugal weight 16 and ride along surfaces of a ramp plate 22 and an inner surface of the clutch cover 12. The ramp plate 22 includes a ramped surface 24 on which the roller 21 moves to cause axial movement of the ramp plate 22. Axial movement of the ramp plate 22 is transmitted through a clamp spring 26 to pressure plates 28. Friction disks 30 are disposed between the pressure plates 28 such that axial movements of the pressure plates 28 clamp the friction disks 30 therebetween.

The biasing member 20 biases the centrifugal weight 16 toward the axis 18 such that the pressure plates 28 are not engaged to the friction disks 30. An alignment tool (not shown) such as a splined shaft is used to align the position of the friction disks 30 relative to the clutch cover 12 and flywheel 14. However, once the alignment tool is removed and prior to an output shaft 32 being installed into the clutch assembly 10, the friction plates 30 are not restrained and are free to move out of the set alignment.

The clutch assembly 10 of this invention includes a plurality of pins 34 holding a corresponding plurality of centrifugal weights 16 in a position causing axial movement and thereby engagement between the pressure plates 28 and the friction disks 30. Each of the pins 34 hold a corresponding centrifugal weight 16 in a position causing application of a clamping force on the friction disks 30 that holds the friction disks 30 in the desired aligned position.

Figure 2:
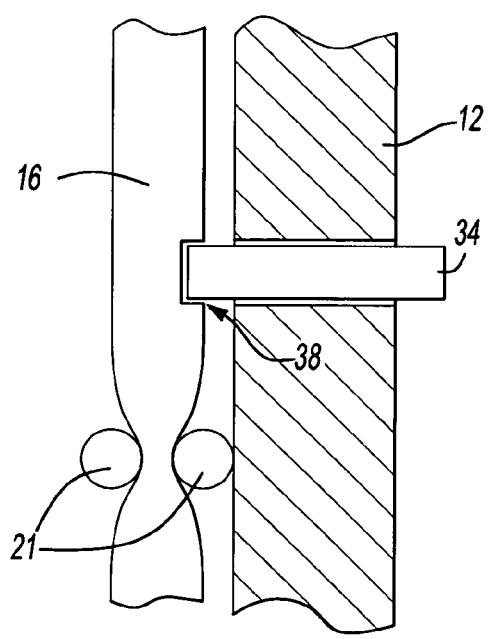
FIG. 2 is an enlarged cross-sectional view of the positioning pin of this invention in an assembly position.

Referring to FIG. 2, each pin 34 extends through an opening 36 in the clutch cover 12 and into a cavity 38 defined within the centrifugal weight 16. The biasing spring 20 exerts a force holding the pin 34 against one side of the opening 36. The opening 36 for the clutch cover 12 may extend through the entire thickness of the clutch cover 12 or may be configured as a blind hole not extending entirely through the clutch cover 12. Preferably, all the centrifugal weights 16 are held, however, it may only be required to hold selected centrifugal weights 16 to retain the friction disks 30 in a desired aligned position.

The pin 34 temporarily holds the centrifugal weights 16 during assembly, and prior to installation of the output shaft 32. The pin 34 is fabricated from a frangible material that shears in response to centrifugal force driving the centrifugal weights 16 radially outward.

Figure 3:
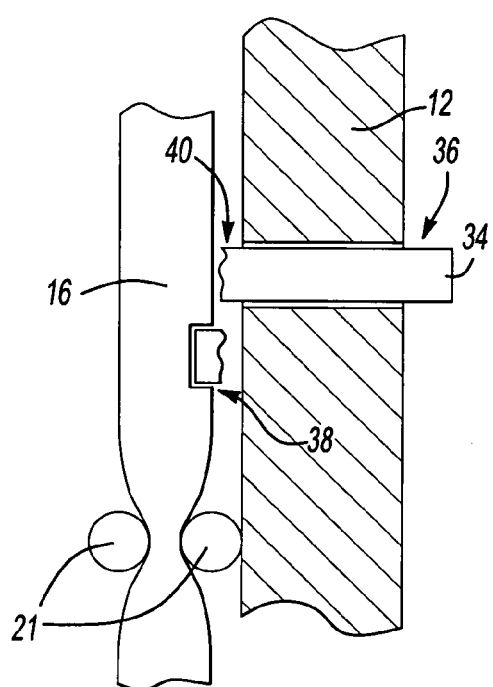
FIG. 3 is an enlarged cross-sectional view of the positioning pin of this invention after being sheared.

Referring to FIG. 3, assembly of the output shaft 32 to the clutch assembly 10 fixes the friction disks 30 in the desired aligned position. Accordingly, the pins 34 are no longer required to maintain friction disk 30 alignment. The pin 34 maintains position of the centrifugal weights 16 until the clutch assembly 10 is rotated to a speed that creates sufficient centrifugal force to shear the pin 34. The pin 34 shears along a shear plane 40 in response to the centrifugal force from the centrifugal weights 16. Once the pin 34 has sheared, the centrifugal weights 16 rotate freely responsive to rotation of the clutch assembly 10.

Residue from the pin 34 is simply dropped into the clutch assembly 10. As appreciated, the environment within the clutch assembly 10 includes residue from the friction disks 30. Additional residue and material from the pin 34 is substantially insignificant in comparison to the residue and debris found within the clutch assembly 10 and does not affect operation of the clutch assembly 10. The sheared remains of the pin 34 may contact one another sporadically during clutch operation. Such sporadic contact will shear and wear additional material from the sheared ends until such contact no longer occurs.

Figure 4:
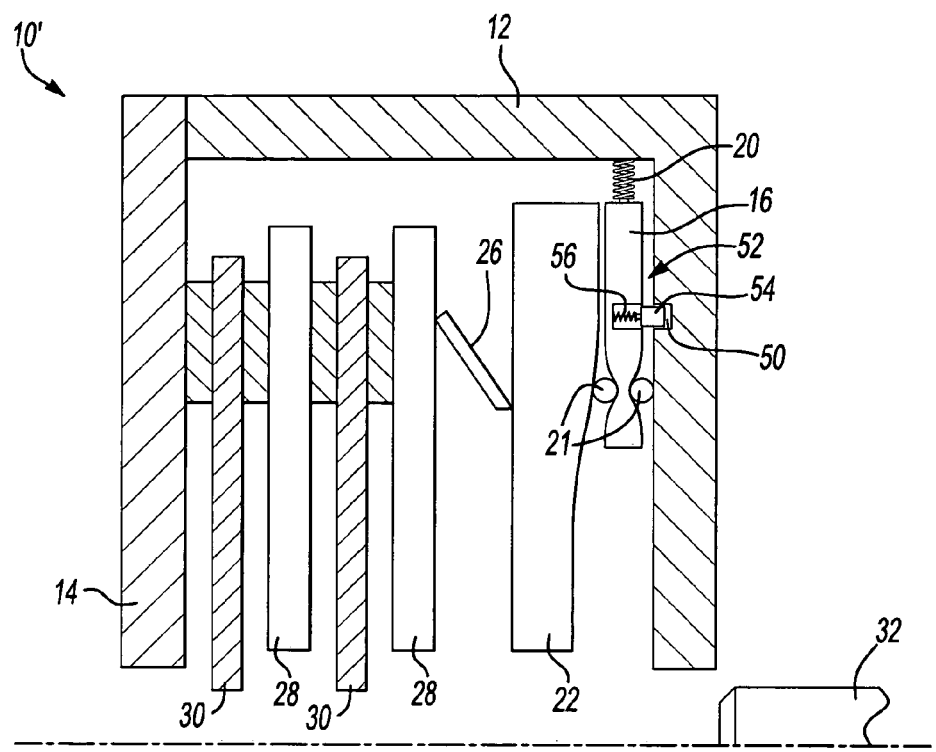
FIG. 4 is a cross-sectional view of clutch assembly with another positioning pin according to this invention.

Referring to FIG. 4, another alignment device 10' according to this invention includes a retractable pin 54 disposed within a cavity 52 defined within the centrifugal weight 16. A retraction spring 56 biases the pin 54 coward a retracted position within the cavity 52. During assembly, the pin 54 is pulled from the cavity 52 and inserted into a corresponding opening 50 within the clutch cover 12. The pin 54 may be fabricated from any material, including steel or plastic.

Figure 5:
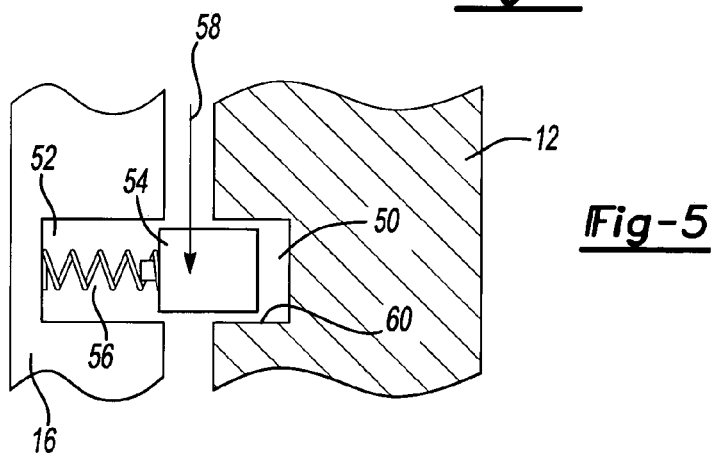
FIG. 5 is an enlarged cross-sectional view of the positioning pin in an assembly position.

Referring to FIG. 5, the biasing spring 20 exerts a biasing force in the direction indicated at 58. The biasing force pushes the pin 54 against a surface 60 of the opening 50. Friction between the pin 54 created by the force 58 normal to the surface 60 maintains the pin 54 in the extended position and holds the centrifugal weights 16 in a position clamping the friction disks 30 in the aligned position. The friction force prevents the pin 54 from being pulled back into the cavity 52 by the retraction spring 56. The pin 54 therefore remains within the cavity 50 during assembly.

Figure 6:
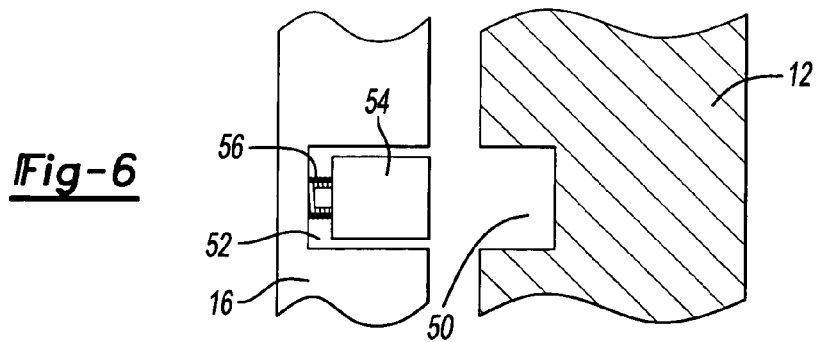
FIG. 6 is an enlarged cross-sectional view of the positioning pin according to FIG. 4 during normal operation of the clutch assembly.

Referring to FIG. 6, the pin 54 retracts into the cavity 52 once centrifugal forces drive the centrifugal weights 16 outward away from the axis 18 and against the biasing force 58. Rotation of the clutch cover 12 lifts the pin 54 of the surface 60. Once the pin 54 lifts off the surface 60, the frictional force previously holding the pin 54 is reduced to a point below that of the force exerted by the retracting spring 56. The pin 54 is pulled out of the opening 50 and into the cavity 52 of the centrifugal weight 16. The centrifugal weight 16 may then move freely between engaged and disengaged positions without interference from the pin 54. Further, the retraction spring 56 holds the pin 54 within the cavity 52 of the centrifugal weight 16 during operation such that the pin 54 does not interfere with operation and movement of the centrifugal weights 16.

Figure 7:
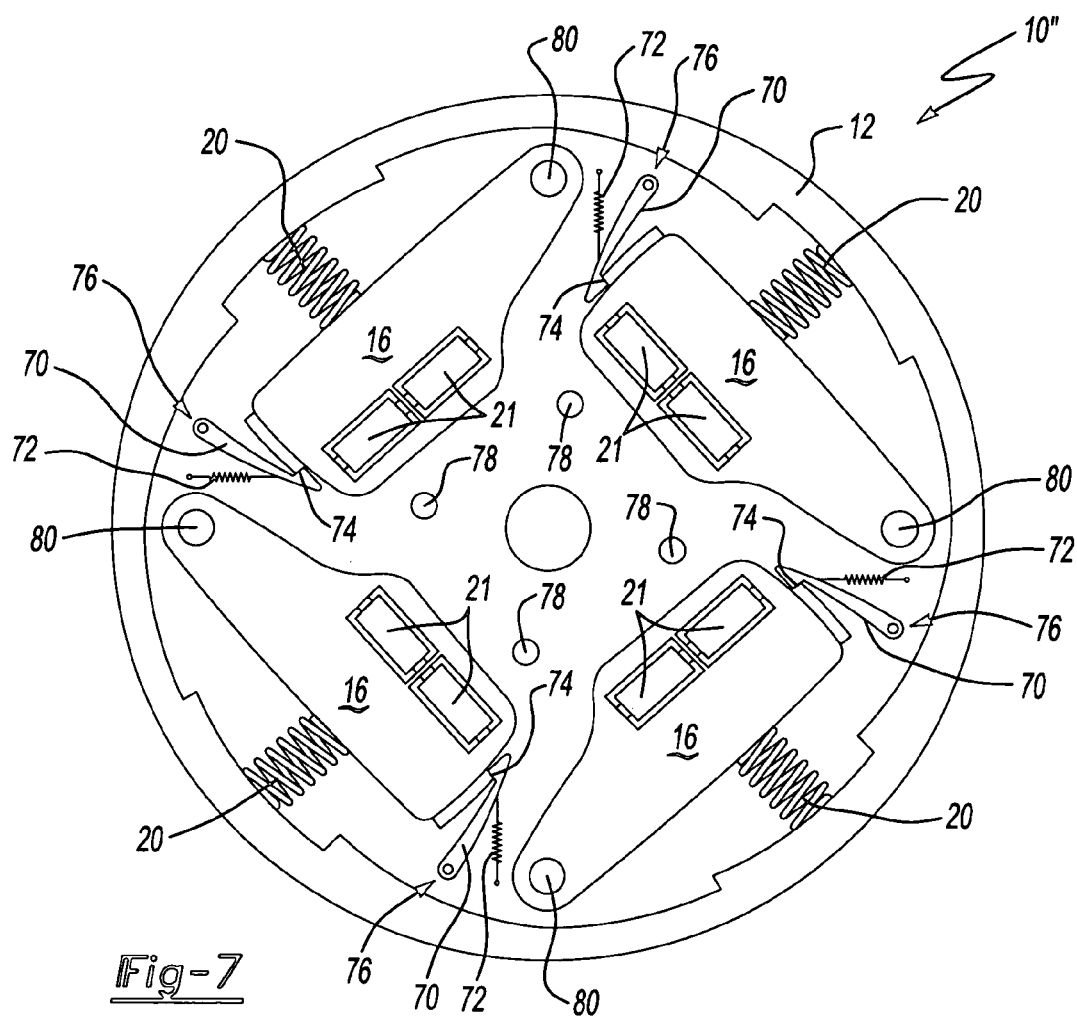
FIG. 7 is a plan view of centrifugal weights mounted within a clutch assembly.

Referring to FIG. 7 another alignment device according to this invention includes a hook 70 that rotates about pivot axis 76 and that engages a stepped surface 74 incorporated on the centrifugal weights 16. The hook 70 is biased away from the centrifugal weights 16 by a retraction spring 72. The biasing spring 20 pushes each of the centrifugal weights 16 about pivot axis 80 toward a stop pin 78. The fully open position of the clutch assembly 10" includes each of the centrifugal weights 16 being positioned against the stop pins 78. In this position, the pressure plates 28 do not apply clamping force against the friction disks 30.

Figure 8:
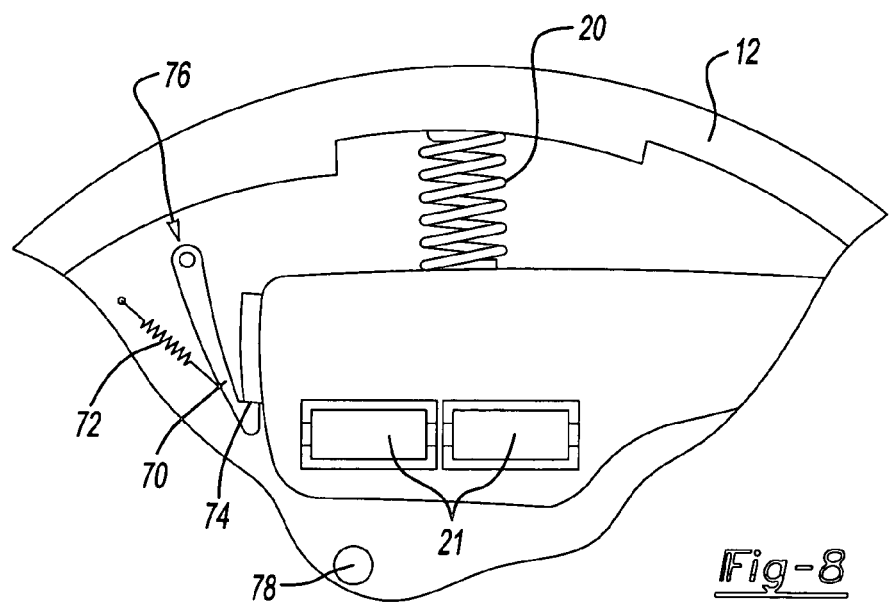
FIG. 8 is a partial view of a single centrifugal weight and a positioning hook.

Referring to FIG. 8, the hook 70 holds each of the centrifugal weights 16 in a position causing application of clamping force by the pressure plates 28 on the friction disks 30 in a desired aligned position. The hooks 70 are held in place by a friction force generated by the biasing force exerted by the biasing springs 20 on each of the centrifugal weights 16. The biasing spring 20 pushes on the centrifugal weight 16 and against the hook 70 such that a frictional force is created between the hook 70 and the hook surface 74. The frictional force prevents the biasing spring 72 from pulling the hook 70 free of the hook surface 74.

Figure 9:
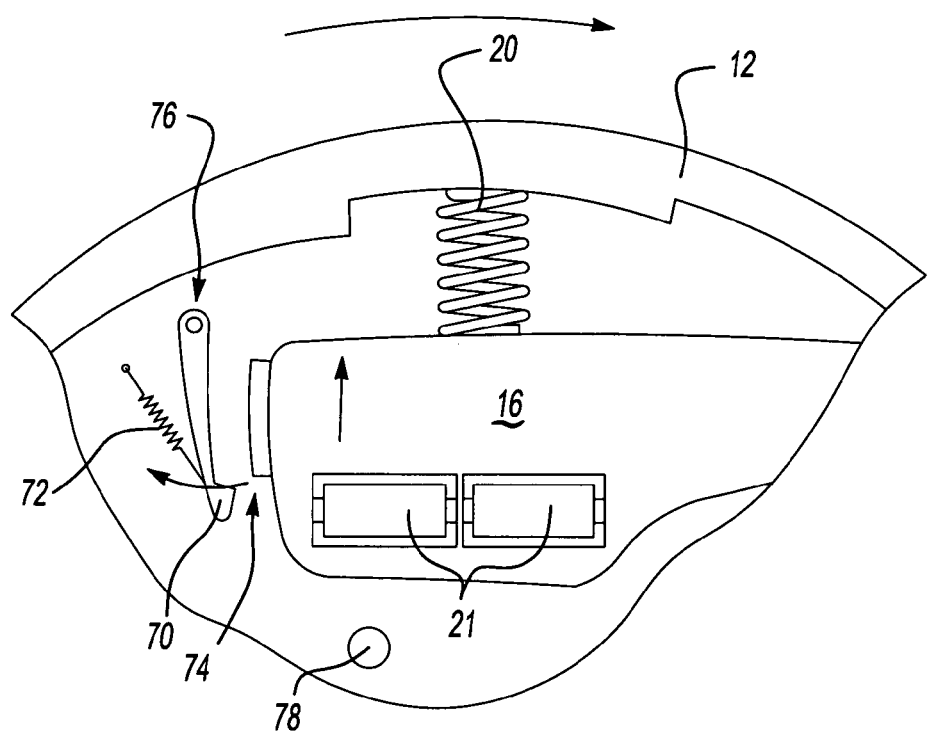
FIG. 9 is a partial view of a single centrifugal weight positioned to release the positioning hook.

Referring to FIG. 9, after completed assembly of the output shaft 32 to the clutch assembly 10", the clutch assembly is rotated. Initial operation of the clutch assembly 10" generates a centrifugal force that overcomes the biasing spring 20. Rotation of the centrifugal weights 16 outwardly toward the clutch cover 12 removes the forces holding the hook 70 such that the biasing spring 72 pulls the hook 70 clear of the hook surface 74.

Figure 10:
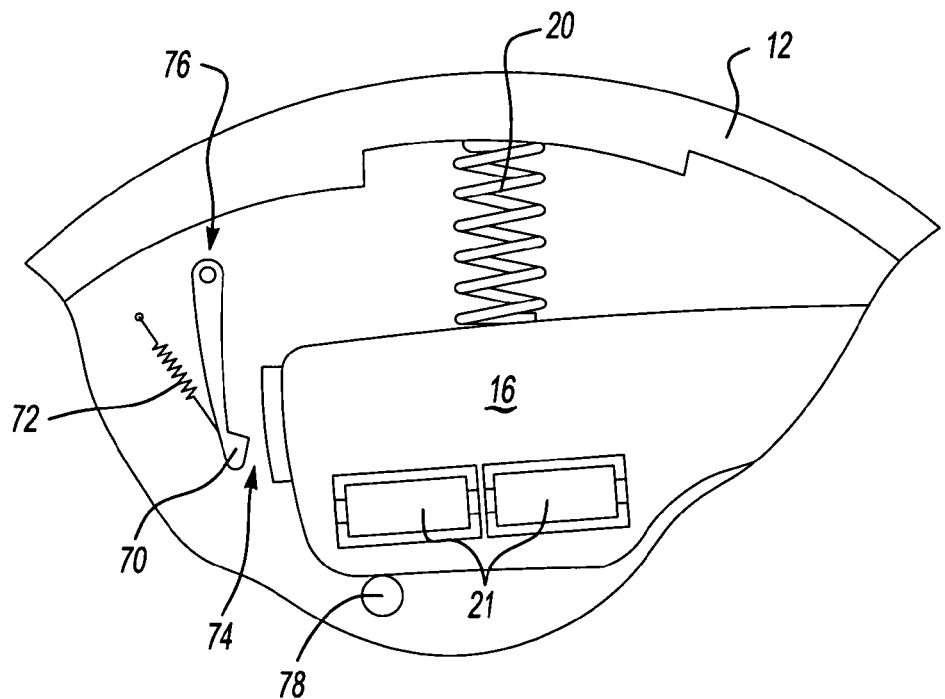
FIG. 10 is a partial view of a single centrifugal weight and the release hook in a fully released position.

Referring to FIG. 10, with hook 70 pulled clear, and held clear of the centrifugal weight 16, normal operation can occur allowing the centrifugal weight 16 to move freely against the stop pins 78 to provide the fully open clutch position.

Figure 11:
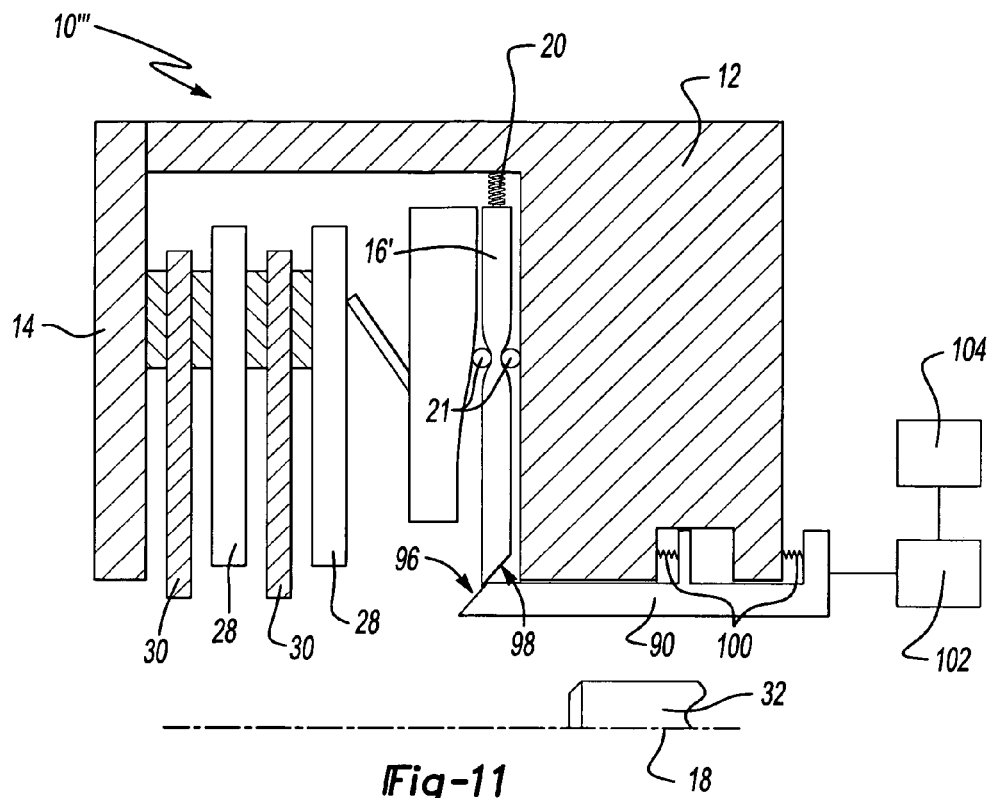
FIG. 11 is a schematic illustration of a normally open clutch assembly including a sleeve engaged to a centrifugal weight.

Referring to FIG. 11, another clutch assembly 10''' according to this invention includes a movable sleeve 90 that engages and moves each centrifugal weight 16' into a position causing clamping engagement between the pressure plates 28 and the friction disks 30. The sleeve 90 includes an engagement surface 96 acting on a corresponding surface 98 of the centrifugal weight 16'. The sleeve 90 is biased axially by springs 100. The sleeve 90 is preferably biased toward a retracted position corresponding to an open position of the centrifugal weight 16'.

A drive 102 controls movement of the sleeve 90 between the retracted position, and an engaged position. In the engaged position the ramped surface 96 of the sleeve 90 moves along the axis 18 to engage the ramped surface 98 of the centrifugal weight 16'. Engagement between the ramped surfaces 96,98 translates axial movement of the sleeve 90 into radial movement of the centrifugal weights 16'. The radial movement outward of the centrifugal weights 16' moves the rollers 21 along the ramped surface 24 of the ramp plate 22. Movement of the rollers 21 along the ramped surface 24 results in axial movement of the ramp plate and clamping of the friction disks 30 between the pressure plates 28.

The sleeve 90 is moved to the engaged position to move the centrifugal weights 16' to a position that causes clamping of the friction disks 30. Once the friction disks 30 are aligned, the sleeve 90 is moved to the engaged position causing application of a clamping force on the friction disks 30. The clamping force on the friction disks 30 maintains the desired alignment until assembly is completed by installation of the output shaft 32.

Figure 12:
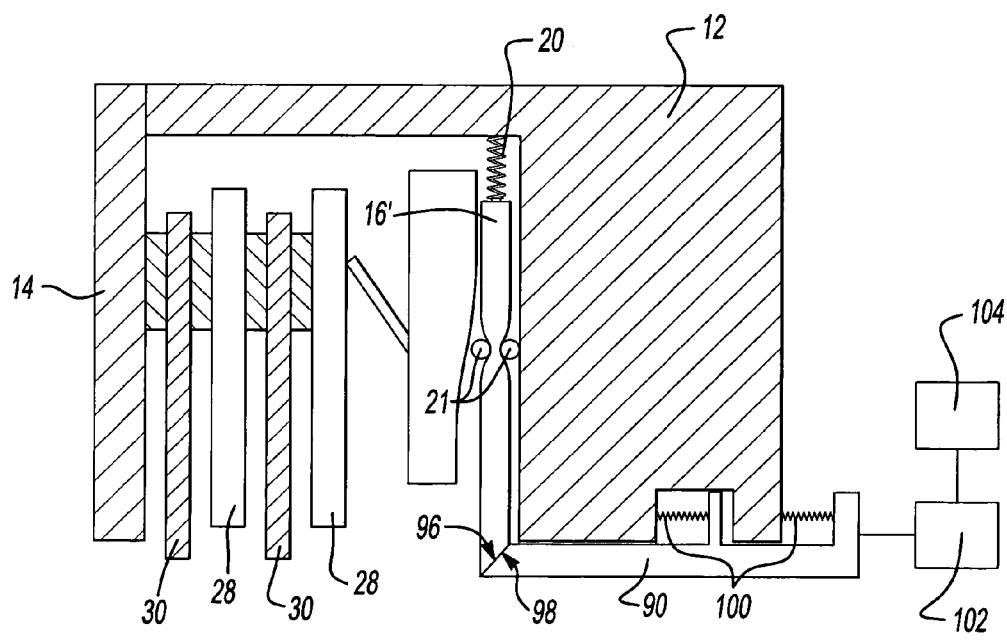
FIG. 12 is a schematic illustration of the normally open clutch assembly of FIG. 11 with the sleeve in a release position.

Referring to FIG. 12, once installation of the output shaft 32 is complete the sleeve 90 is movable to the retracted position to release the friction disks 30. The sleeve 90 is biased axially, outward of the clutch assembly 10 to allow free radial pivoting of the centrifugal weights 16'. The sleeve 90 remains within the clutch assembly 10''' after completed assembly.

The drive 102 can be actuated to hold the sleeve 90 in during the assembly process and can be connected for actuation during clutch assembly operation. The drive 102 may be any kind of controllable drive known in the art. For example, the drive 102 maybe a hydraulically or pneumatically controlled cylinder, or an electromechanical device such as an electric motor or a solenoid. Further, a controller 104 is in communication with the drive 102 to control engagement of the sleeve 90 with the centrifugal weights 16.

The sleeve 90 may be actuated to engage the centrifugal weights 16 and cause full clamping pressure to be applied to the friction disks 30 under conditions were there is normally insufficient centrifugal force to cause full engagement of the clutch assembly 10. For, example, it may be desirable in some driving conditions to fully engaged the clutch assembly 10 before sufficient centrifugal force is created to fully drive the centrifugal weights 16 outward to cause full clamping force against the friction disks 30.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A normally open clutch assembly comprising:
   a clutch cover attachable to a rotatable input member;
   a friction plate;
   a pressure plate movable between a clamped position engaging said friction plate and an open position released from said friction plate;
   a plurality of centrifugal weights movable to drive said pressure plate to said clamped position; and
   a corresponding plurality of holders engageable to said plurality of centrifugal weights to hold said plurality of centrifugal weights in a desired position, wherein at least one of said plurality of holders is movable independent of at least one other of said plurality of holders.

2. The assembly as recited in claim 1, wherein said plurality of holders comprise a plurality of pins and each of said plurality of pins are received within an opening within each of said plurality of centrifugal weights and biased toward a retracted position where said plurality of pins are detached from said clutch cover.

3. The assembly as recited in claim 2, wherein said each of said plurality of pins move to said retracted position responsive to rotation of said plurality centrifugal weights.

4. The assembly as recited in claim 3, comprising a corresponding biasing member biasing each of said plurality of pins toward said retracted position.

5. The assembly as recited in claim 1, wherein said plurality of holders are movable between an engaged position with said plurality of centrifugal weights and a released position.

6. The assembly as recited in claim 5, wherein said plurality of holders are pivotally attached to said clutch cover.

7. The assembly as recited in claim 5, wherein said plurality of holders are biased toward said released position.

8. The assembly as recited in claim 5, wherein each of said plurality of holders disengage from each of said plurality of centrifugal weights responsive to rotation of said clutch cover.

9. The assembly as recited in claim 5, wherein said plurality of holders comprises a plurality of hooks engaging a surface of a corresponding one of said plurality of centrifugal weights.

10. The assembly as recited in claim 1, wherein said plurality of holders are rendered inoperable for holding a corresponding one of said plurality of centrifugal weights once said corresponding one of said plurality of centrifugal weights is moved from said desired position.

11. The assembly as recited in claim 1, wherein each of said plurality of holders are frangible.

12. The assembly as recited in claim 11, wherein each of said plurality of holders are frangible responsive to rotation of the clutch assembly.

13. A normally open clutch assembly comprising:
    a clutch cover attachable to a rotatable input member;
    a friction plate;
    a pressure plate movable between a clamped position engaging said friction plate and an open position released from said friction plate;
    a plurality of centrifugal weights movable to drive said pressure plate to said clamped position; and
    a corresponding plurality to holders engageable to said plurality of centrifugal weights to hold said plurality of centrifugal weights in a desire position, wherein said plurality of holders comprise a plurality of pins extending between said clutch cover and said plurality of centrifugal weights.

14. The assembly as recited in claim 13, wherein said plurality of pins are frangible.

15. The assembly as recited in claim 14, wherein said pin plurality of pins are frangible responsive to rotation of said clutch cover.

16. The assembly as recited in claim 13, wherein at least a portion of each of said plurality of pins are detachable from said clutch cover responsive to movement of said plurality of centrifugal weights.

17. A normally open clutch assembly comprising:
    a clutch cover attachable to a rotatable input member;
    a friction plate;
    a pressure plate movable between a clamped position engaging said friction plate and an open position released from said friction plate;
    a centrifugal weight movable to drive said pressure plate to said clamped position; and
    a frangible holder engageable to said centrifugal weight to hold said centrifugal weight in a desired position.

18. The assembly as recited in claim 17, wherein said holder is frangible responsive to movement of the centrifugal weight away from said desired position.

19. The assembly as recited in claim 17, wherein said centrifugal weight comprises a plurality of centrifugal weights and said frangible holder comprises a corresponding plurality of frangible holders, wherein at least one of said plurality of frangible holders is movable independent of at least one other of said plurality of frangible holders.

* * * * *